United States Patent [19]

Iozza

[11] Patent Number: 4,548,152
[45] Date of Patent: Oct. 22, 1985

[54] MARITIME TRANSPORTATION AND DISTRIBUTION SYSTEM AND METHOD FOR BULK RAW MATERIALS

[76] Inventor: Emanuele Iozza, 9 Lungotevere della Vittoria, 00195 Roma, Italy

[21] Appl. No.: 576,954

[22] Filed: Feb. 3, 1984

[51] Int. Cl.$^4$ ............................................. B65G 67/58
[52] U.S. Cl. ..................... 114/260; 114/27; 114/32; 405/1; 405/3
[58] Field of Search ................ 114/260, 258, 259, 45, 114/72, 73, 74 R, 27, 32–35; 405/1, 3, 4, 5, 7; 414/425, 399, 139, 137

[56] References Cited

U.S. PATENT DOCUMENTS

| | | | |
|---|---|---|---|
| 39,683 | 8/1863 | Sharn | 114/27 |
| 2,938,487 | 5/1960 | Franke | 114/32 |
| 3,429,461 | 2/1967 | Fewchel | 414/137 |
| 4,084,529 | 4/1978 | Katernberg | 405/4 |
| 4,361,105 | 11/1982 | Kirby | 114/260 |

FOREIGN PATENT DOCUMENTS 753754  8/1980  U.S.S.R. ............................. 414/137

*Primary Examiner*—Trygve M. Blix
*Assistant Examiner*—C. T. Bartz

*Attorney, Agent, or Firm*—Cushman, Darby & Cushman

[57] ABSTRACT

A system for maritime transportation and distribution of bulk raw materials includes a series of containers, a carrier vessel, a container unloading dock for unloading material from each container, and a loading dock for loading material into each container, each container having openings in the stern and bow walls for loading and unloading materials, provided with watertight covers and/or valves, and having no hatches on deck so that the containers can be stacked one on the other, the vessel having a hold provided with a port for the flotation loading and unloading of the containers into and out of the hold, the hold comprising retention devices to lock each container to the structure of the carrier vessel, in the stowage position the containers being stacked one on the other in a multilayer arrangement, the unloading dock being a sloping bed graving dock which includes a tunnel located underneath the same in communication with the floor of the dock through openings provided with watertight covers, and a conveyor in the tunnel leading to a store yard, the loading dock being a sloping bed dock provided with a charging hopper located on the head of the dock and fed by a conveyor.

8 Claims, 13 Drawing Figures

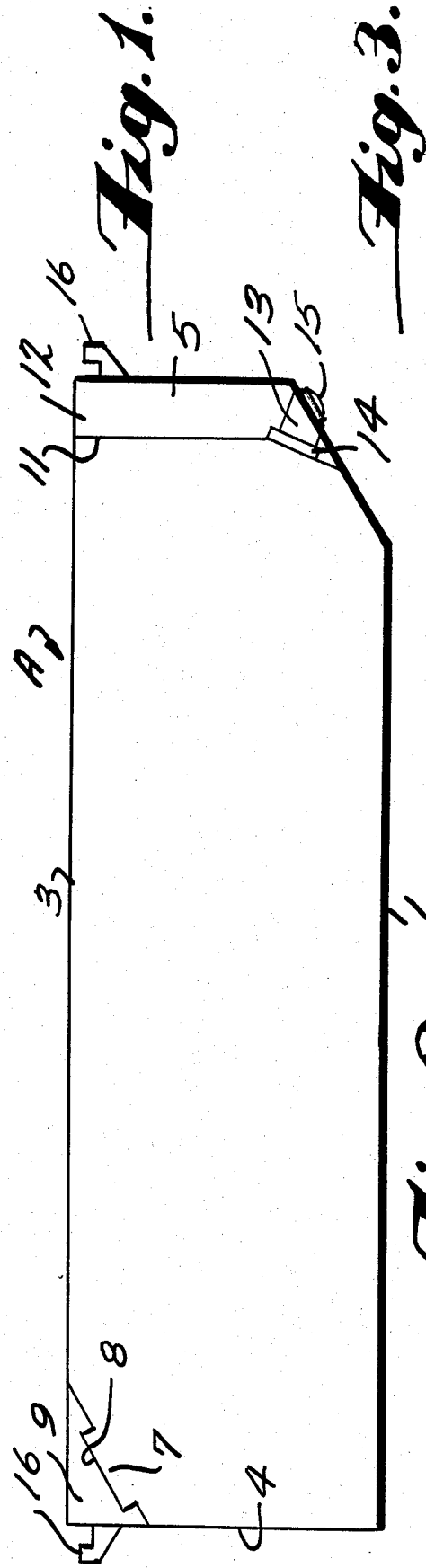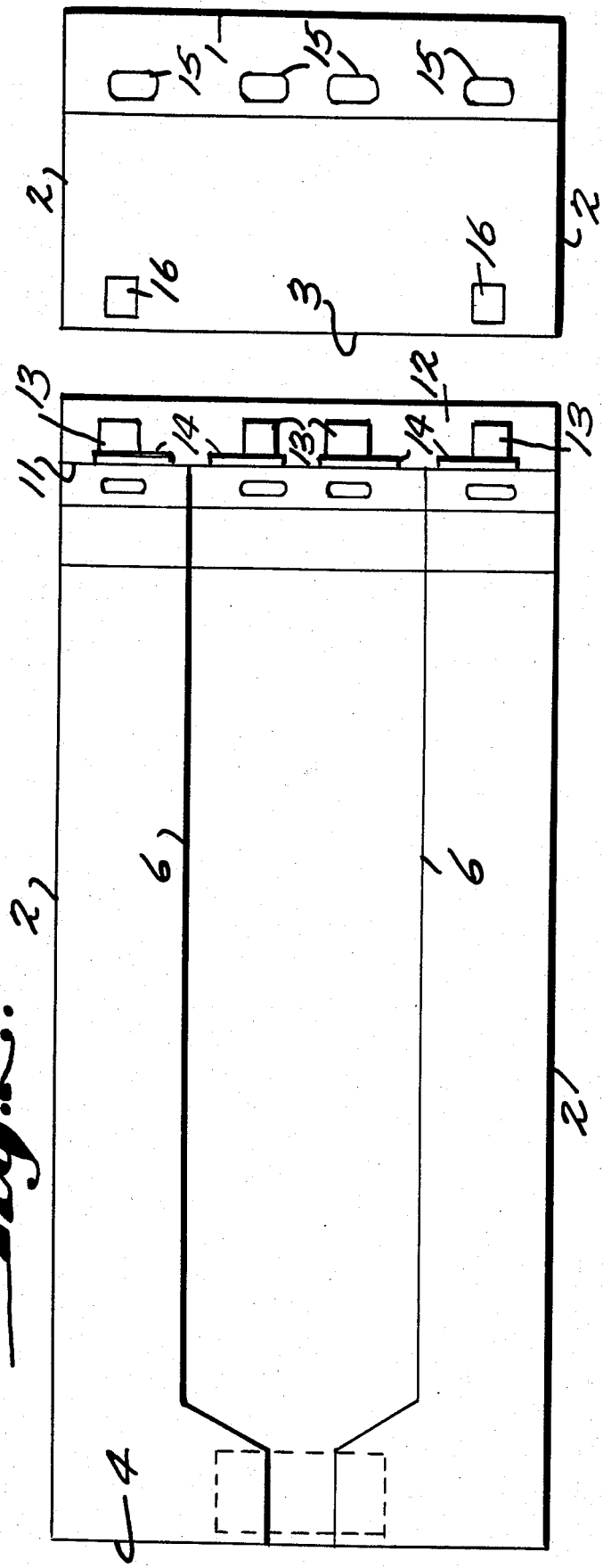

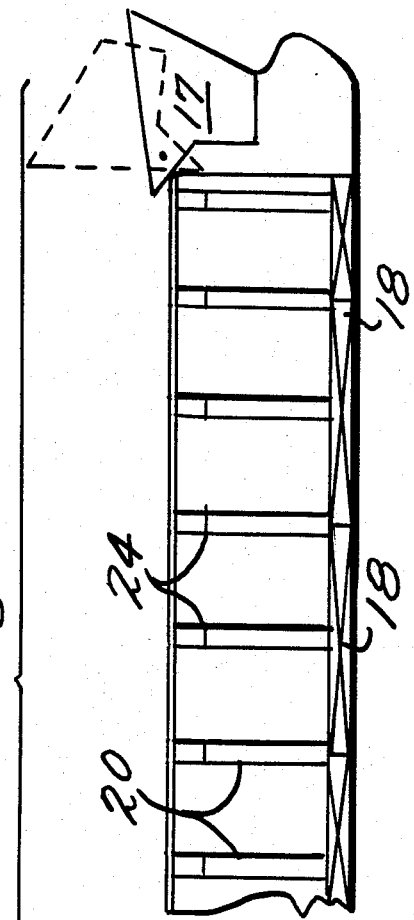
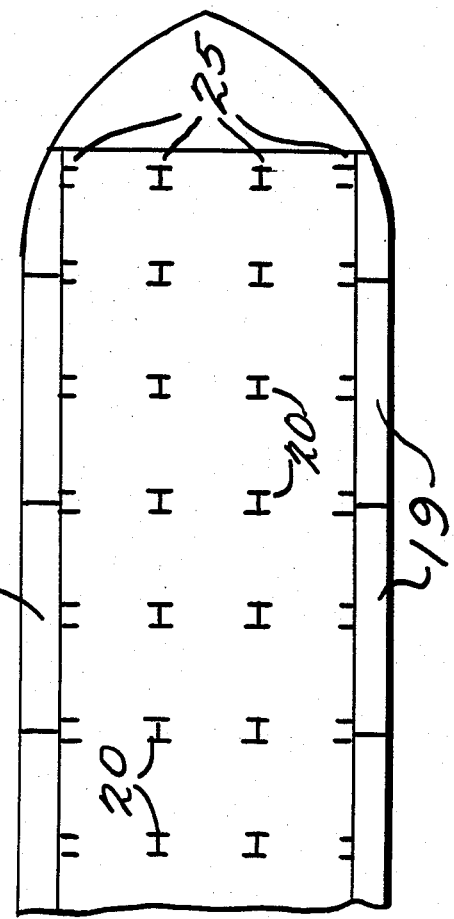
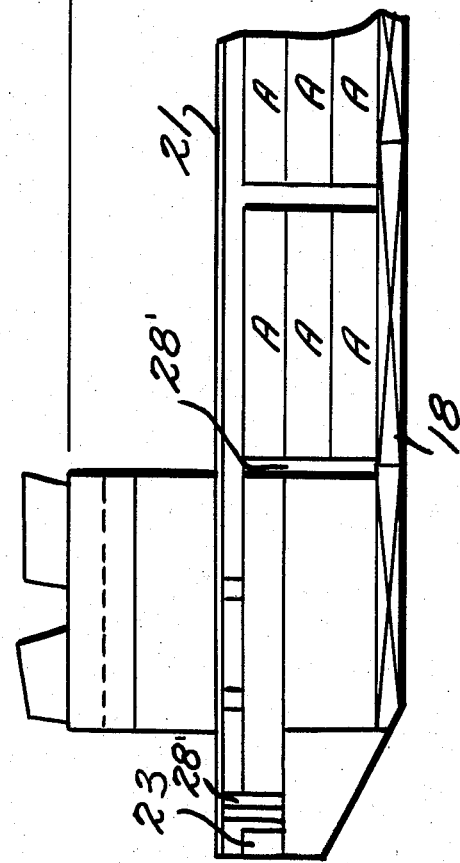
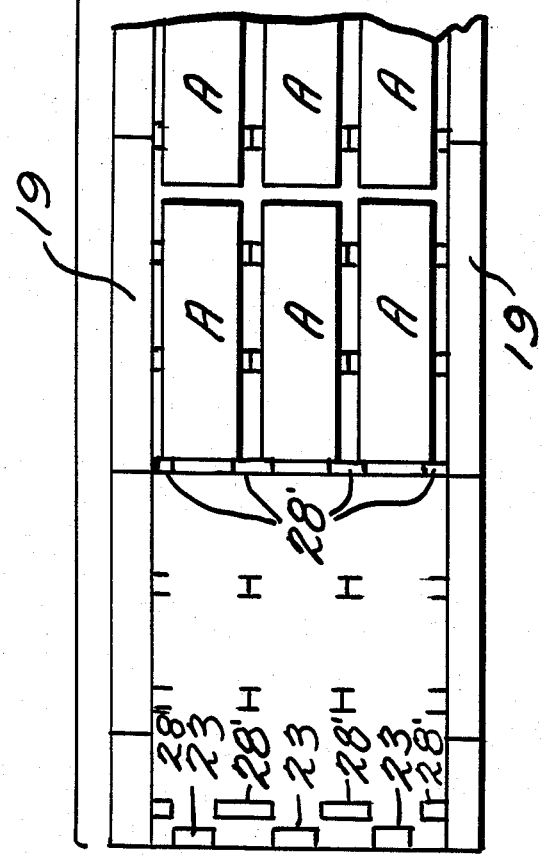

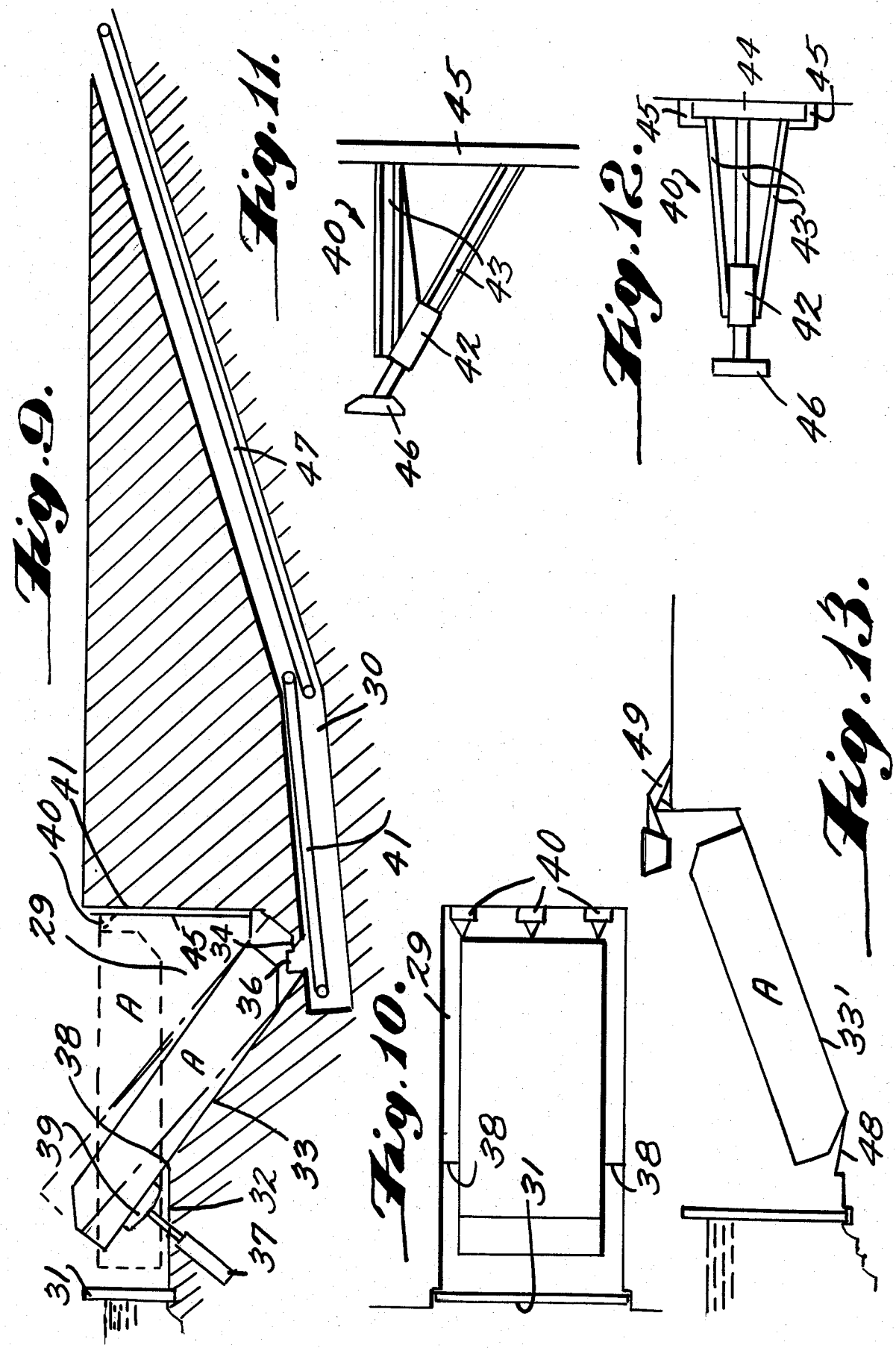

MARITIME TRANSPORTATION AND DISTRIBUTION SYSTEM AND METHOD FOR BULK RAW MATERIALS

BACKGROUND OF THE INVENTION

Heavy difficulties were encountered in this last decade by a number of industrialized countries in competing in the maritime transportation field. A more sophisticated technology of maritime transport, finalized to reach higher productivity is requested to allow industrialised countries to profitably manage maritime transportation in the proximate future.

In the sixties a relevant increase of productivity was achieved in many sections of maritime transport, due especially to the ship mammothing trend. This trend has brought up the ship to encounter the harbour depth in many areas of the world. Waterborne crude oil tankers overcame this problem by being moored at an open sea pipeline terminal, but in the solid bulk raw material transport the harbour depth represents today one of the biggest restraints to further increase the ship size and consequently the transport productivity. Another restraint is the way unloading operations are carried out; particularly the intermittance in the flow of cargo from ship to shore and the repetitive translations and movements of the bucket are a bottleneck in transport productivity and also a source of atmospheric pollution.

The harbour infrastructure in fact represents today the biggest restraint to the increase in transport productivity. Modifications at the harbour structures to cope with the new traffic requirements would require very long time and also very huge investments; these on the other side are not always justified as they would advantage only a section of the industry while their weight is supported by all the collectivity.

The system object of the present invention relates to massive solid bulk raw material transport and provides a substantial increase in the maritime transport productivity by requesting minor modifications in the harbour structure.

During the past years a number of significant technological developments were carried out on the united cargo transportation to solve the interface problems between maritime and piggy-backing or river transport. Container vessels and barge carrier vessels were built and also flotation loading and unloading of barges through a gate on the vessel were developed. Some embodiments were also proposed for having barges stowed in a number of layers in the hold of the carrier vessel but the solutions proposed call for very costly structure of the carrier vessel and elaborate operations for loading and unloading of barges.

Accordingly, it forms the main object of the present invention to provide a new system and method of transport such that barges could be stacked one on the other into the hold of the carrier vessel in the same way as containers are stacked into the container ship. For reaching this target barges are to be perfectly watertight and have no hatches; consequently the loading and unloading operations of the cargo into the barges can no more be done as usually by means of buckets moved by travelling cranes but by having barges put in a sloping trim and cargo moved and transferred by its own weight.

A further object of the present invention is the barge carrier vessel itself whose structure, fittings and arrangements have to allow the stacking operation of barges into the hold.

Thus, main objects of the present invention are:

to provide an improved maritime transportation system employing a novel type of barge; the barge-container, having no hatches, being perfectly watertight and capable to be stacked one on the other; to provide a novel type of loading and unloading of the cargo into the barge container in which the barge container is placed on a sloping trim and the cargo is moved and transferred by its own weight; to provide an improved barge carrying waterborne vessel in which barge containers are stacked one on the other in a multilayer configuration, and the vessel itself is capable to be overimmersed in a proper dredged area in the harbour basin for flotation loading and unloading.

SUMMARY OF THE INVENTION

The invention calls for means for having the barges stacked one on the other in a multilayer configuration in the hold of a barge carrier vessel. For such a purpose barges at first are to be sound and watertight when completely submerged. They have no hatches but a number of openings on the end walls, closed by proper gate valves or watertight covers.

One or more longitudinal bulkheads are fitted for compartmenting the barge especially when in ballast.

The barge carrier vessel is a dock hold vessel type for transportation of heavy cargo, having compartmented double bottoms and wing tanks for obtaining a single large hold without any transverse watertight bulkheads. The vessel may be of the self-propulsion type or of the integrated tug-barge type. Its hold has some longitudinal bulkheads or a number of pillars lined on longitudinal plans which split the hold in corridors having a proper breadth in accordance with the barges breadth.

A retention system is provided to lock the barges to the structures of the carrier vessel and to maintain the same in their submerged position when the hold is flooded. The flotation loading and unloading of barges into the hold through a proper gate on the carrier vessel is in fact carried out by stowing one layer barge configuration at a time.

When the first layer of floating barges has entered the hold, the carrier vessel is deballasted and gets moving upwards as far as the layer of barges comes into contact with the carrier vessel double-bottom; in this position the retention system is activated and the barges locked to the vessel structures.

The vessel is then ballasted again and the hold flooded so as to allow a second barge layer to enter the hold; when the barges of this second layer are in position, the carrier vessel is deballasted again as far as the barges are stacked on those of the first layer and in this position locked to the structure of the carrier vessel.

The operation will prosecute as long as the hold is completely loaded.

The invention also calls for a basin to be dredged on the harbour depth to allow huge barge carrier vessels to be overimmersed for loading or unloading operations while the carrier vessel is staying safely in the harbour.

It is accordingly a further object of the present invention to provide special means for putting the barge in a sloping trim either for its loading as for unloading. In one such unloading embodiment the barge is let entered in a graving drydock having a proper sloping bed. By emptying the dock the barge is placed on the bed. A number of watertight doors are placed on the floor of the dock putting in communication the dock itself with a tunnel where a conveyor belt system is fitted. By opening the watertight doors on the dock floor and the gate valves on the barge, the cargo is moved by its own weight from the barge to the conveyor belts and translated by these directly to the store yard.

For the loading of the barge the above mentioned arrangement is modified as no watertight door is fitted on the floor of the dock but the cargo is transported through a conveyor belt into a charging hopper on the head of the dock fitted at the loading opening of the barge.

BRIEF DESCRIPTION OF THE DRAWINGS

In the drawings:

FIG. 1 is a longitudinal section view of a barge container at the longitudinal center plane;

FIG. 2 is a horizontal section view of the barge container taken along the middle height of the same;

FIG. 3 is a front view of the bow of the barge container;

FIG. 4 is a longitudinal section view of barge container carrier vessel, partially cut away to illustrate the arrangement of the hold with the stacked barge containers and when empty;

FIG. 5 is a corresponding horizontal section view of the carrier vessel at the middle height of the hold;

FIG. 9 is a longitudinal section view of the barge container unloading system;

FIG. 10 is a top view of the barge container unloading dock;

FIG. 11 is an enlarged end view of the main structure of the barge container retention system fitted on the unloading dock;

FIG. 12 is a corresponding top view of FIG. 11; and

FIG. 13 is a longitudinal section view of the barge container loading system.

DESCRIPTION OF SOME PREFERRED EMBODIMENTS

Figure 6:
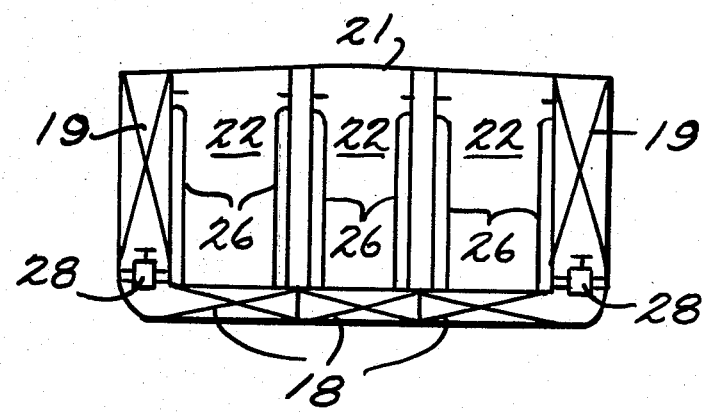
FIG. 6 is a transversal section view of the carrier vessel.

The Barge-Container of FIGS. 1 to 3

FIGS. 1-3 show somewhat diagrammatically a barge container A which illustrates the main embodiments of the invention. The barge container has a hull with a bottom wall 1, side walls 2, a deck wall 3, a stern wall 4 and a bow wall 5. Two longitudinal bulkheads 6 divide the cargo space into three compartments for assuring to the barge proper stability when in ballast condition. The loading of the barge is carried out on the stern through an opening 7 closed by a watertight cover 8 which could be hinged to the structure of the barge.

Another closing device for the opening 7 could be an electro-hydraulic operated watertight door which sliding on its guides enters into one of the two recesses 9 aside of the opening 7.

A watertight bulkhead 11 is fitted on the fore for obtaining a cofferdam 12 separating the cargo space from the bow wall 5.

The unloading of the barge is carried out through four openings provided with conduits 13. Four sliding valves 14 on the bulkhead 11 separate the cargo space from the conduits and four watertight autoclave covers 15 separate the conduits from the outside. Either the sliding valves or the watertight covers 8 and 15 are operated by pneumatic or oleodynamic or electric actuators.

The power for operating the actuators is supplied usually by an external source.

Some proper hooks 16 are arranged on the front and rear walls to allow the connection of a number of barge containers to each other by means of cables or chains. These hooks will act also as spacers when barges are assembled into the carrier vessel.

Figure 7:
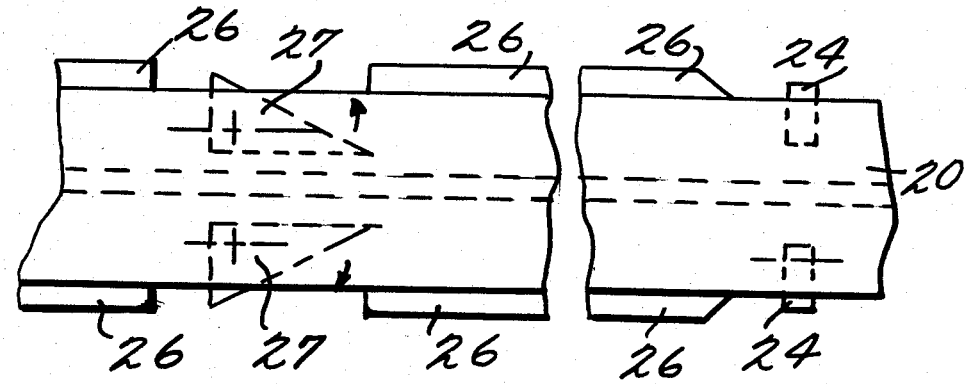
FIG. 7 is an enlarged end view of fragmentary portions of a pillar of the carrier vessel to illustrate the various embodiments supported by the same.
Figure 8:
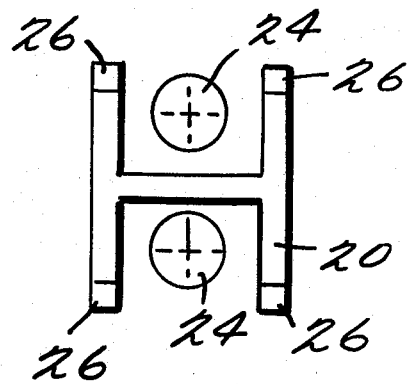
FIG. 8 is a corresponding plan section of the pillar taken at the rolling fenders.

The Barge Container Carrier Vessel of FIGS. 4 to 8

With reference to FIGS. 4, 5, 6, 7, 8 a bow port 17 is fitted on the bow of the vessel for the access of the barge containers into the hold. A double bottom 18 and a number of wing tanks 19 run alongside the hold for all its length.

A number of pillars 20 extending from the double bottom 18 up to the deck 21 are lined on longitudinal planes and split the hold in three corridors 22. Three capstans 23 are arranged at the aft of the vessel hold to be used for hauling the trains of barges into the corridors.

Some rolling fenders 24 at the barge entrance floating level are fitted on both sides of a number of pillars to maintain in a straight course the movement of barges during their entrance into the hold.

Movable pawls 25 are fitted on the first pillars in front of the bow port for maintaining the barges of each row in contact with each other during the upward movement of the carrier vessel.

These movable pawls slide horizontally on proper guides and are spaced vertically nearly half the height of the barges to be sure that the longitudinal restraint of the barges be maintained for all the vertical relative movement of the same with reference to the carrier vessel.

Wooden lined guides 26 are fitted on a number of pillars to maintain the barges in their proper transverse position during the upward movement of the carrier vessel as long as they reach their stowage position.

Retention devices 27 are fitted on the pillars to lock the barges in this position to the structure of the carrier vessel. Said retention devices can also be apt to be interposed between the barge container layers so as to reduce the load of the upper barge containers on the lower ones.

A number of sea chest valves 28 are fitted on the sides and also at the aft bulkhead of the hold to assure a direct communication of the flooding water with the sea and get easy the withdrawal and the entrance of the water into the hold during the barges embarking operation.

The double bottom 18 and the wing tanks 19 are properly compartmented. A computer determines and gets activated the opening and the closing of the proper valves of the ballast subsystem in accordance with the inputs received from the fore and aft draughts of the carrier vessel so that an upward even-keel movement of the vessel is obtained during all the stowage operation of the barges.

The embarking operation is carried out from a cargo station arranged in the carrier vessel according to the following procedure:

the carrier vessel enters the embarking harbour and is moored in a proper place where a dredged area in the depth provides a basin capable to conveniently receive the bottom part of the vessel when the same is overimmersed.

The carrier vessel is then ballasted, its hold flooded and the bow port 17 opened. The ballast will prosecute as long as the vessel will reach the proper draught to receive the first layer of barges.

The rows of barges taken in tow by a tug arriving at the entrance of the hold are hooked to the cables of capstans 23. These are activated from the cargo station and the barges rows are hauled into the hold guided by the rolling fenders 24, while each tug will work for steering properly its own row of barges from outside the vessel. When the first barge of the row comes into contact with its pawl 28', the tug will push the barges one on the other so that they come into contact with their hooks 16 acting as spacers, obliging each barge to reach their proper position. At this stage the movable pawls 25 are activated so that all the barges of the row are maintained in contact with each other during the upward movement of the carrier vessel.

The system for deballasting the vessel is then activated and the vessel is moved upwards in an even-keel trim; during this operation the flooding water is withdrawn from the hold through the withdrawal subsystem comprising the sea chest valves and the entrance gate too, and the barges are forced in their proper position through the wooden lined guides 26 and the movable pawls 25.

When all the barge containers of the first layer come into contact with the double bottom, the deballasting will be stopped. The retention system is then activated and the barges are locked to the structures of the carrier vessel.

At this stage the vessel is ballasted again allowing the second layer of barge containers to enter the hold and the operation will prosecute as above detailed until the hold has been filled up.

The Barge Container Unloading and Loading System

As illustrated in FIGS. 9 to 13 the barge container unloading system is composed by a graving dock 29 and a tunnel 30 located underneath the deepest floor of the dock and leading to the store yard ground level.

A caisson gate 31 separates the dock from the sea.

The bed of the dock is composed by two sections: a horizontal section 32 and a sloping bed 33.

On the floor 34 of the dock a number of openings 35 put into communication the dock itself with the tunnel 30.

Watertight covers 36 are fitted in the openings 35.

A column type hydraulic jack system 37 is fitted on the horizontal section of the bed to support the aft section of the barge when the same is starting to rotate around the edge 38 for taking place on the sloping bed 33.

The system is composed by a number of jacks lined in a plane nearly normal to the sloping bed 33.

A rigid platform 39, embracing a proper bottom area of the barge, is pivoted to each end of the jacks so that it may match and support through all the contact area the barge during its rotation. The power for operating the system is controlled by the movement of the barge container.

A barge retention system 40 is fitted on the front wall 41 of the dock to support the barge during its sloping operation and to assure the same will take its proper position on the bed.

The retention system is composed by a number of column-type hydraulic jacks 42 each of them fitted on proper arm structure 43 having a sliding block 44 sliding on vertical guides 45 fitted on the front wall 41 of the dock. A barge embracing element 46 is pivoted on the end of the jack to allow its matching with the barge during the sloping operation of the same.

The system is operated through a double control power: oil is pumped into the hydraulic system when the pistons are called to elongate their strokes for matching the movement of the barge, while oil is recovered from the system when the pistons contract their strokes.

The vertical movement of the arm structure is carried out through a system controlled by the movement of the barge or by the water level in the dock.

A number of conveyor belts 47 are fitted on the tunnel 30.

The barge container unloading operation will start with the entrance of the floating barge into the dock and the placing of the same in the proper position with its bow wall meeting the retention system 40. The caisson gate 31 is closed and the water pumped out from the dock. The aft bottom of the barge comes then in contact with the platform 39 of the hydraulic jack system 37.

At this stage the jacks 42 of the retention system are put under stress by having the hydraulic system at the rated pressure. The jack system 37 and the retention system 40 are then activated to match the sloping movement of the barge around the edge 38 while water is going to be pumped out from the dock. This operation will last until the bottom of the barge comes in contact with the sloping bed 33. When the water is completely evacuated from the dock the covers 36 are removed, the conveyor belts 47 are activated, the barge autoclave covers 15, sliding valves 14 and loading watertight cover 8 are opened, and the cargo is moved by its own weight from the barge to the conveyor belts 47 and translated by these directly to the store yard.

At the end of unloading operation the sloping angle of the barge is increased by activating the hydraulic jack system 37 to allow the complete emptying of the barge.

In FIG. 13 a loading system is illustrated. At the loading station a barge sloping trim lower than that of the unloading station is requested and also the complete evacuation of the water from the dock is not necessary.

For these reasons the sloping bed 33' has been arranged facing the entrance of the dock; no tunnel and no hydraulic jack system are requested.

The retention of the barge on the sloping bed is realised by shaping the bed with a step 48 where the barge lower bow end abuts.

A charging hopper 49 is fitted on the head of the dock and a conveyor belt (not shown) is arranged for feeding the charging hopper.

While the present invention has been described with reference to a particular embodiment, many alterations and modifications may be practiced without departing from the spirit and scope thereof. It is therefore the intent that the present invention not be limited to the above, but only be limited as defined in the following claims.

I claim:

1. A system for maritime transportation and distribution of bulk raw materials, including in combination: a series of substantially identical watertight barge containers, a barge container carrier vessel, a barge container unloading dock for unloading said material from each barge container, and a barge container loading dock for loading said material into each barge container, each of said barge container having openings in the stern and bow walls for loading and unloading said materials, provided with watertight covers and/or valves, and having no hatches on deck so that said barge containers can be stacked one on the other, said barge container carrier vessel having a hold provided with a port for the flotation loading and unloading of the barge containers into and out of the hold, said hold comprising retention means to lock each barge container in its stowage position to the structure of the carrier vessel, in said stowage position the barge containers being stacked one on the other in a multilayer arrangement, said barge container unloading dock being a sloping bed graving dock comprising a tunnel located underneath the same in communication with the floor of the dock through openings provided with watertight covers, in said tunnel conveyor means being located which lead to a store yard, said barge container loading dock being a sloping bed dock provided with charging hopper means located on the head of the dock and fed by conveyor means.

2. The system according to claim 1, wherein said retention means of the vessel hold are arranged in longitudinally lined up pillars extending from the bottom up to the deck of the vessel, said pillars being also provided with rolling fenders to guide and maintain in a straight course the movement of barge containers during their entrance into the hold, said retention means being also apt to be interposed between the barge container layers so as to reduce the load of the upper barge containers on the lower ones.

3. The system according to claim 1, wherein movable pawl means are arranged in the vessel in front of said port and guide means are arranged along said hold of the vessel, for maintaining all the barge containers in their proper position during the upward movement of the vessel when the latter is deballasted.

4. The system according to claim 1, wherein said barge container unloading dock comprises a horizontal section and a sloping bed, the horizontal section being provided with jack means to support, through platform means pivoted on the jack piston rod ends, the aft section of a barge container during the rotation of the same for being placed on said sloping bed when pumping out the water from the dock, the cargo being then unloaded from the sloping barge container by its own weight, the power for operating said jack means being controlled by the movement of the barge container.

5. The system according to claim 4, wherein said barge container unloading dock further comprises barge container retention means arranged on the front wall of the dock to support and guide the bow section of a barge container during its rotation for being placed on said sloping bed when pumping out the water from the dock, said retention means consisting of jack means sliding along vertical fixed guides and supporting, through elements pivoted on the jack piston rod ends, the bow section of the barge container, the power for operating said jack means and their vertical sliding movement being controlled by the movement of the barge container or by the water level in the dock.

6. The system according to claim 1, wherein the sloping bed of said barge container loading dock is shaped with a step where the lower bow end of a barge container, when in sloping trim, abuts.

7. The system according to claim 1, wherein said watertight covers and/or valves of each barge container are operated by pneumatic or hydrodynamic or electric actuators by power fed from an external source or a source fitted on the barge container.

8. A method for maritime transport and distribution of bulk raw materials, comprising the steps of: loading with said materials a series of substantially identical watertight barge containers in a sloping bed loading dock through openings in the stern walls of said barge containers, such barge container being placed on the sloping bed of said dock upon evacuating the water from the dock; sealing said openings; flooding with water said loading dock; transporting rows of floating barge containers, thus loaded, from said loading dock to a barge container carrier vessel, moored in a dredged area of the harbour depth apt to receive the bottom part of the vessel when the same is overimmersed; ballasting the vessel and flooding its hold with its bow port opened, this ballasting prosecuting as long as the vessel will reach the proper draught to receive a first layer of barge containers; hauling said first layer of barge containers into the hold of the vessel, each barge container being properly guided and thus reaching its proper flooding position in the hold; deballasting the vessel and withdrawing the flooding water from its hold, so as to obtain an upward even-keel movement of the vessel while the barge containers are properly guided and maintained in their proper position; stopping the deballasting when all the barge containers of said first layer come in contact with the bottom of the vessel, and then activating retention means in the hold to lock each barge container to the structure of the vessel; ballasting the vessel again allowing the second layer of barge containers to enter the hold; prosecuting the operation as long as the hold has been filled up, with the barge containers being stacked in their final stowage position directly one on the other in a multilayer arrangement; unloading the layers of barge containers from the vessel, in the harbour of destination in which the vessel is moored in a proper dredged area, this unloading being carried out by a stop sequence substantially inverse to the loading sequence; transporting rows of floating barge containers from the vessel to a sloping bed unloading dock; evacuating the water from said unloading dock, each barge container being thus placed on the sloping bed of the same; finally opening valve means on openings in the bow walls of the barge containers, the cargo being then unloaded from the barge containers by its own weight.

* * * * *